Figure 1:
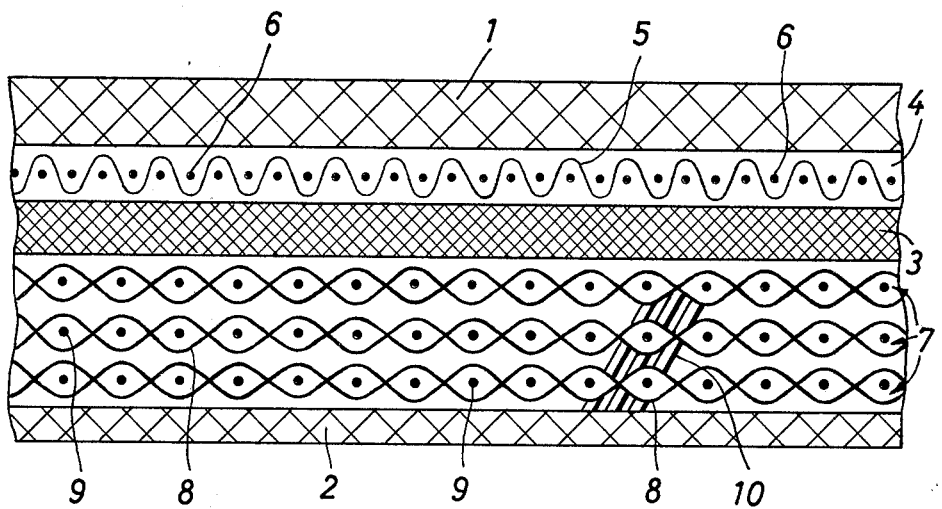

United States Patent [19]

Hartmann

[11] 3,944,060
[45] Mar. 16, 1976

[54] TRANSVERSELY STIFF CONVEYOR BELT

[76] Inventor: Karl Hartmann, 37, Liebrechtstrasse, 413 Rheinkamp-Utfort, Germany

[22] Filed: Jan. 11, 1974

[21] Appl. No.: 432,542

[30] Foreign Application Priority Data
Jan. 12, 1973  Germany.................. 7301108[U]

[52] U.S. Cl................... 198/193; 139/411; 74/232
[51] Int. Cl.².......................................... B65G 15/34
[58] Field of Search .......... 198/184, 193, 194, 201; 139/408, 409, 411; 161/91, 162; 260/857 D; 74/232, 233

[56] References Cited
UNITED STATES PATENTS

| | | | |
|---|---|---|---|
| 683,547 | 10/1901 | Bowers | 198/201 |
| 927,648 | 7/1909 | Gates | 198/201 |
| 3,144,930 | 8/1964 | Michels | 198/193 |
| 3,205,119 | 9/1965 | Paul | 198/193 UX |
| 3,224,566 | 12/1965 | Elliott | 198/193 |
| 3,388,083 | 6/1968 | Kwok | 260/857 D |
| 3,414,108 | 12/1968 | Jackson et al. | 198/193 X |
| 3,485,707 | 12/1969 | Spicer | 198/193 X |
| 3,596,753 | 8/1971 | Knapp | 198/193 |
| 3,620,357 | 11/1971 | Folkes | 198/193 |
| R26,731 | 12/1969 | Robinson | 198/193 X |

FOREIGN PATENTS OR APPLICATIONS

| | | | |
|---|---|---|---|
| 2,130,012 | 12/1972 | Germany | 198/193 |
| 1,310,951 | 10/1962 | France | 139/408 |

*Primary Examiner*—Evon C. Blunk
*Assistant Examiner*—Richard K. Thomson
*Attorney, Agent, or Firm*—Burns, Doane, Swecker & Mathis

[57] ABSTRACT

A transversely stiff conveyor belt in which a layer of elastomeric material is disposed between a carrying surface and a nuclear layer and in which another layer of elastomeric material is disposed between the nuclear layer and a treading surface. One layer of elastomeric material has a filament network embedded therein which comprises slightly-extendable transversely-disposed weft filaments and substantially-extendable longitudinally-disposed warp filaments. The other layer of elastomeric material has at least one filament network embedded therein which comprises high-strength longitudinally-disposed warp filaments and bending-resistant transversely-disposed weft filaments.

10 Claims, 2 Drawing Figures

U.S. Patent  March 16, 1976  3,944,060

TRANSVERSELY STIFF CONVEYOR BELT

The present invention relates to a transversely stiff or rigid conveyor belt of elastomeric material provided at both sides of a nuclear layer or carcass between said layer and a carrying or conveying layer and a treading or contact layer, respectively, with inlays of a fabric or filament network.

The term "transversely stiff" as used in connection with the conveyor belt in the present application is meant to indicate that the conveyor belt is of particular stiffness or rigidity transversely of its longitudinal direction or direction of movement, a stiffness which acts to suppress any trough formation or depression and arching of the conveyor belt. The stiffness or rigidity in longitudinal direction, on the other hand, is normal so that he conveyor belt may be passed around pulleys of the usual diameter. Various constructions of transversely stiff conveyor belts have become known which are destined in the first place for the transportation of people. As a rule, however, the known designs have no more than imperfect properties of transverse stiffness, i.e. they are relatively stiff in longitudinal direction as well so that they can be used only in connection with pulleys of extremely great diameters. Besides, their lifetime normally is rather short and, as they cannot be produced by customary manufacturing methods or machines, they are expensive.

The applicant's German utility model No. 7 123 318 discloses a conveyor belt comprising several inlays each at both sides of the nuclear layer or carcass. These inlays at both sides enhance and reinforce one another and form a composite structure which imparts the transverse stiffness or rigidity to the conveyor belt. As regards the plane of the conveyor belt this particular characteristic is given in both directions in other words, with respect to one of the two covering surfaces it acts against any concave as well as convex buckling i.e. to prevent a depression in as well as arching of the conveyor belt. With a number of practical applications, however, the transverse stiffness is needed or desired in one direction only. Such applications are, for instance, vertical conveyance over several levels with deflected route or horizontal conveyance along one line only without any deflection. In these cases the known conveyor belt either cannot be used or would involve unnecessarily high expenditure because of its many inlays.

Thus it is an object of the invention to provide a transversely stiff conveyor belt which is readily capable of return movement.

It is also an object of the invention to provide a conveyor belt which is easy to manufacture and has a long lifetime.

It is yet another object of the invention to provide a conveyor belt which has optimum stiffness in transverse direction, preferably in one direction only.

According to the invention there is provided a transversely stiff conveyor belt of elastomeric material provided at both sides of a nuclear layer between said nuclear layer and a carrying layer and a treading layer, respectively, with inlay means of a fabric or filament network each, having transversely disposed weft threads, wherein a single inlay means comprising high-strength, little expansible weft threads and being itself expansible in longitudinal direction is provided at one side of said nuclear layer, and wherein at least one inlay means at the other side of said nuclear layer affords tensile strength in longitudinal direction and each inlay means at said other side of said nuclear layer is designed for great resistance against compressive forces in transverse direction.

The transverse stiffness or rigidity of the conveyor belt according to the invention is based on the interaction of the single expansible inlay which displays poor elongation in transverse direction and is disposed at one side of the nuclear layer or carcass and the inlays at the other side of the nuclear layer or carcass which, as a whole, are capable of being upset or compressed only very little and of which at least one is characterized by tensile strength. Normally, the expansible inlay is disposed between the carrying or conveying layer and the carcass, in other words, remote from the pulleys. This imparts to the novel conveyor belt a transverse stiffness in such direction as to oppose any convex arching of the carrying surface as required, for instance, for vertical conveyance and desired especially for operation of the conveyor belt with marginal slats which are fixed on the belt along its sides and which should not tilt outwardly. As the expansible inlay does not resist the revolving and return movement around pulleys, very small diameters may be chosen for the pulleys, even smaller ones than with the applicant's own earlier conveyor belt, without causing the formation of any folds or pleats due to compression or upsetting. The expansible inlay, however, may also be arranged between the contact or treading layer and the carcass. This is realized in the simplest manner by merely inverting the conveyor belt of which only one type of construction need be made. Then the novel design will act to oppose the formation of a concave depression or trough in the carrying surface of the conveyor belt. This is desired, or example, in the case of horizontal conveyance without the use of transverse bars where the conveyor belt upon its return normally undergoes such arching, because of its operating tension, that surface profiles of wave-shaped cross sectional area become oriented inwardly thus making it difficult to arrange suitable guide rolls or pulleys to assist in the return movement. With this latter embodiment the advantage of easy return movement even around pulleys of very small diameter is given up to some degree because the expansible inlay is disposed at the inside with respect to the pulleys. The tensile stresses occurring during operation of the conveyor belt essentially are taken up by the inlay or inlays which have tensile strength. Their number and the design of the warp threads in them consequently is determined largely, as usual, in accordance with the respective loading.

With the conveyor belt according to the invention the desired transverse stiffness in one direction is obtained at a minimum of expenditure. This applies above all to the inlays which are provided only where their function is required. As the inlays are made of fabric or networks of filaments or threads, the novel conveyor belt may be produced by conventional calendering or mechanical doubling processes on conventional equipment available. This makes the novel conveyor belt very inexpensive. It is a special advantage of the conveyor belt according to the invention that it affords its transverse stiffness also in the two very marginal zones next to the edges of the belt. This is important, for instance, in vertical conveyance where the greatest bending stresses occur in the lateral areas approximately 100 to 200 mm from the belt edges. Moreover, in the middle the conveyor belts usually are stiffer anyway because of entrainment bars or blocks mounted on the surface.

The expandability of the expansible inlay may be obtained, for example, by appropriate aligning of the filaments in the network or fabric of the inlay. However, preference is given to an expansible inlay which comprises expansible warp threads. Warp threads of unstretched or only slightly prestretched or shrunk polyamide are especially well suited.

Normally weft threads which resist bending but are still capable of being woven are used for all inlays in order to obtain the great tensile strength in transverse direction of the expansible inlay and the high resistance against compression of the other inlays. The weft threads which are resistant to bending may be embodied, for instance, by metal wire or elements similar to metal wire such as steel cord. Preferably, weft threads of polyester are used for all inlays. For the expansible inlay these may be prestretched so as to provide especially good tensile strength and poor elongation. Apart from the above, prestretched glass filaments or polyester and glass fiber mixed strands may also be used. The weft threads of the other inlays may be polyester monofilaments, with a view to the desired great resistance to compressive forces. But also the other inlays may be made of mixed twisted weft threads having a polyester content.

In most cases only inlays which are characterized by tenacity i.e. tensile strength will be disposed at the other side of the carcass opposite the single expansible inlay. Yet also at that other side an expansible inlay may be provided in addition to the inlay or inlays of tensile strength in order to increase the resistance to compressive forces or upsetting. Such expansible inlay will then be disposed as remote as possible from the carcass between the respective covering surface and the inlay or inlays of tensile strength.

In the case of conveyor belts for light and medium loads sufficient resistance to compressive forces is obtainable by employing as the inlays of tensile strength ordinary fabric which has been hardened or rendered rigid by chemical pretreatment. Then it may, however, become necessary to use one more inlay of tensile strength than would correspond to the load on the conveyor belt. Chemical strengthening, of course, may be employed in addition also with the inlays of tensile strength which comprise the specific weft threads mentioned above.

The resistance to compression is also increased by using an embedding elastomer for the inlays of tensile strength, which elastomer is set to be at least as hard as the elastomer of the carrying layer but as a rule even harder than that. This will prevent the inlays of tensile strength from becoming displaced relative to one another upon compressive stress. The same effect is obtained from textile flakes admixed to the embedding elastomer of the inlays of tensile strength. Such admixing of textile flakes is especially useful if the embedding elastomer cannot be adjusted to be quite so hard because of dynamic stresses. Textile flakes of polyester or nylon are especially well suited.

An adjustment of the hardness of the elastomer of the carcass to a value which is at least as high as, but preferably higher than that of the elastomer of the carrying layer promotes the interaction of the expansible inlay with the tenacious inlays resulting in the transverse stiffness. Therefore, this measure is applied in most cases for the tenacious inlays, either alone or in addition to the adjustment or design of the embedding elastomer described. As with the embedding elastomer textile flakes, preferably of polyester or nylon, may also be admixed to the elastomer of the carcass for the same reasons.

The transverse stiffness is further enhanced to a certain degree by a harder adjustment of the elastomer of the carrying layer and the treading layer or by admixing textile flakes to the same.

Yet it is a disadvantage of hard carrying and treading layers that their resistance against mechanical stresses exerted by the goods being transported and their frictional values are lowered.

With conveyor belts for medium and heavy loads it is often useful to have longitudinally continuous, narrow insert strips of fabric and/or a filament network embedded in the carrying and/or treading layer in the two marginal zones of the conveyor belt so as to obtain optimum distribution of the tranvserse stiffness across the width of the conveyor belt. The width and arrangement of the insert strips are variable within wide limits to suit the respective requirements. Conveniently any insert strips adjacent the expansible inlay are capable of being extended in longitudinal direction as is the inlay in order not to impair the property of easy return movement of the conveyor belt. As a rule, each marginal zone will be furnished with one, sometimes two insert strips.

Alternatively, in the case of conveyor belts for smaller loads it may be sufficient for the establishing of suitable transverse stiffness if the expansible inlay takes up only two partial areas of the overall width of the conveyor belt in the two marginal zones of the conveyor belt.

Figure 2:
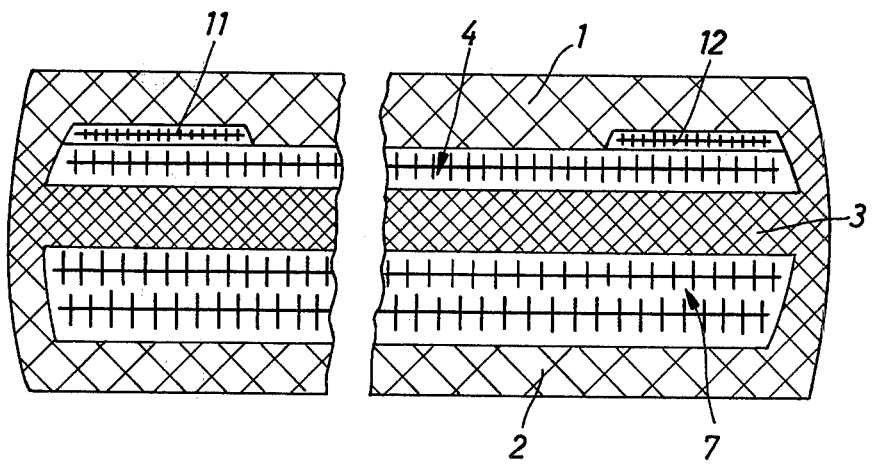

In order that the invention may be clearly understood and readily carried into effect two embodiments thereof will now be described by way of example with reference to the accompanying drawing, in which:

FIG. 1 is a longitudinal sectional elevation of part of a conveyor belt according to the invention, FIG. 2 is a transverse sectional elevation of another conveyor belt according to the invention.

The conveyor belt shown in FIG. 1 is constructed of a customary elastomeric material, such as rubber. It comprises a carrying or conveying layer 1 and a contact or treading layer 2 of conventional hardness as well as a nuclear layer or carcass 3, the elastomer of which is selected to be harder than that of the other two layers.

An inlay 4 embodied by a fabric is disposed between the carrying layer 1 and the carcass 3. The fabric of the inlay 4 comprises warp threads 5 of slightly prestretched or unstretched polyamide extending in longitudinal direction of the conveyor belt and being highly expansible. The fabric is of such structure that frequent bends in the warp contribute to the expandability of the material. The weft threads 6 of the expansible inlay 4 which are arranged transversely of the longitudinal direction of the conveyor belt are made of a polyester and are relatively thick and resistant to bending. They are of great tensile strength and their expandability or capability of elongation is very poor.

Three inlays 7, each made of a fabric which is rendered particularly tenacious by strong warp threads 8 extending in longitudinal direction of the conveyor belt, are positioned between the treading layer 2 and the carcass 3. The transversely oriented warp threads 9 of the tenacious inlays 7 are formed by relatively thick polyester threads which resist bending. The inlays 7 which are characterized by tensile strength and the inlay 4 which is expansible are covered in conventional manner by an embedding elastomer 10, shown only at one place for reasons of clarity. The hardness of this embedding elastomer is approximately the same as that of the elastomer of the carcass 3. Thus great resistance to compression or upsetting in transverse direction is imparted to the composite structure of the three tenacious inlays 7.

The conveyor belt shown in FIG. 2 is of the same structure as the embodiment illustrated in FIG. 1. Yet it comprises only two inlays 7 of tensile strength. And instead, two insert strips 11 and 12, both of the same width, which are continuous in longitudinal direction, are embedded in the carrying layer 1 in the two marginal zones of the conveyor belt. These insert strips are made of a fabric which is expansible in longitudinal direction, as the expansible inlay 4 and of high tensile strength and poor expandability or elongation in transverse direction.

In a modification of the conveyor belt shown in FIG. 2 the expansible inlay 4 is left out altogether so that at one side of the carcass 3 there are provided only the two insert strips 11 and 12 which are expansible in longitudinal direction and embedded in the marginal zones of the conveyor belt.

The invention may be embodied in other forms without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A transversely stiff conveyor belt of elastomeric material provided at both sides of a nuclear layer of elastomeric material between said nuclear layer and a carrying layer and treading layer, respectively, with inlay means of a filament network each having transversely disposed weft threads, wherein a single inlay means comprising high-strength, low-expansibility, weft threads and being itself expansible in longitudinal direction is provided at one side of said nuclear layer, and wherein at least one inlay means at the other side of said nuclear layer affords tensile strength in longitudinal direction and the inlay means at said other side of said nuclear layer provides greater resistance against compressive forces in transverse direction and greater expansibility in transverse direction than said single inlay means, the relative tranverse expansibility and resistance against compressive forces in tranverse direction of said single inlay means and said other inlay means providing the belt with greater resistance to convex arching of the one of said carrying and treading layers adjacent said single inlay means than of the other of said carrying and treading layers and greater resistance to concave troughing of the other of said carrying and treading layers than of the one of said carrying and treading layers adjacent said single inlay means.

2. A conveyor belt as claimed in claim 1, wherein said expansible inlay means comprises expansible warp threads.

3. A conveyor belt as claimed in claim 2, wherein said warp threads are made of an unstretched or slightly prestretched polyamide.

4. A conveyor belt as claimed in claim 1, wherein said weft threads of said inlay means are resistant to bending yet still capable of being woven.

5. A conveyor belt as claimed in claim 4, wherein said weft threads of said inlay means are made of polyester.

6. A conveyor belt as claimed in claim 1, wherein each inlay means of tensile strength is surrounded by an embedding elastomer which is at least as hard as the elastomer of said carrying layer.

7. A conveyor belt as claimed in claim 1, wherein the elastomer of said nuclear layer is at least as hard as the elastomer of said carrying layer.

8. A transversely stiff conveyor belt of elastomeric material provided at both sides of a nuclear layer of elastomeric material between said nuclear layer and a carrying layer and a treading layer, respectively, with inlay means of a filament network each having transversely disposed weft threads, wherein two strip-shaped inlay means, each disposed in one of the marginal zones of said conveyor belt, are provided at one side of said nuclear layer, and wherein each of said strip-shaped inlay means comprises high strength, low-expansibility weft threads and is itself expansible in longitudinal direction, and wherein at least one inlay means at the other side of said nuclear layer affords tensile strength in longitudinal direction and the inlay means on said other side of said nuclear layer provides greater resistance against compressive forces in transverse direction and greater expansibility in transverse direction than said two strip-shaped inlay means, the relative transverse expansibility and resistance against compressive forces in said transverse direction of said two strip-shaped inlay means and said other inlay means providing the belt with greater resistance to convex arching of the one of said carrying and treading layers adjacent said two strip-shaped inlay means than of the other of said carrying and treading layers and greater resistance to concave troughing of the other of said carrying and treading layers than of the one of said carrying and treading layers adjacent said two strip-shaped inlay means.

9. A conveyor belt as claimed in claim 8, wherein said strip-shaped inlay means comprise expansible warp threads.

10. A conveyor belt as claimed in claim 8, wherein said weft threads of said strip-shaped inlay means are resistant to bending yet still capable of being woven.

* * * * *